(12) United States Patent
Genter et al.

(10) Patent No.: US 9,790,847 B2
(45) Date of Patent: Oct. 17, 2017

(54) MULTI-STAGE TURBOCHARGER SYSTEM WITH OFF-ENGINE LOW PRESSURE STAGE

(71) Applicant: Cummins Inc., Columbus, IN (US)

(72) Inventors: David P. Genter, Columbus, IN (US); David P. Richter, Columbus, IN (US); Andrew Kitchen, Northamptonshire (GB)

(73) Assignee: Cummins Inc., Columbus, IN (US)

( * ) Notice: Subject to any disclaimer, the term of this patent is extended or adjusted under 35 U.S.C. 154(b) by 21 days.

(21) Appl. No.: 14/246,575

(22) Filed: Apr. 7, 2014

(65) Prior Publication Data

US 2015/0285131 A1    Oct. 8, 2015

(51) Int. Cl.
| | |
|---|---|
| F02B 29/04 | (2006.01) |
| F02B 37/00 | (2006.01) |
| F02B 37/013 | (2006.01) |
| F02B 67/10 | (2006.01) |
| F02B 37/007 | (2006.01) |

(52) U.S. Cl.
CPC ............ *F02B 37/004* (2013.01); *F02B 29/04* (2013.01); *F02B 37/001* (2013.01); *F02B 37/013* (2013.01); *F02B 67/10* (2013.01); F02B 37/007 (2013.01); Y02T 10/144 (2013.01); Y10T 29/49231 (2015.01)

(58) Field of Classification Search
CPC .. F02B 37/013; F02B 37/004; F02B 29/0412; F02B 37/007; F02B 29/04; F02B 29/0456; F02B 29/0462; F02B 37/001; F02B 67/10; Y02T 10/144; Y10T 29/49231

USPC ............................................. 60/612; 123/562
See application file for complete search history.

(56) References Cited

U.S. PATENT DOCUMENTS

| | | | |
|---|---|---|---|
| 2,500,234 A | 3/1950 | Bates | |
| 2,668,006 A * | 2/1954 | Larrecq ...................... | 60/39.511 |
| 3,576,102 A | 4/1971 | West | |
| 4,299,090 A * | 11/1981 | Deutschmann ....... | F02B 37/007 60/606 |
| 4,400,945 A * | 8/1983 | Deutschmann et al. ........ | 60/612 |
| 5,269,143 A | 12/1993 | Cikanek et al. | |
| 5,394,854 A | 3/1995 | Edmaier et al. | |
| 5,560,207 A * | 10/1996 | Ramsden .............. | F02B 37/007 60/322 |
| 5,771,868 A | 6/1998 | Khair | |

(Continued)

FOREIGN PATENT DOCUMENTS

| | | |
|---|---|---|
| EP | 1008735 A2 | 6/2006 |
| EP | 2148061 A1 | 1/2010 |

(Continued)

OTHER PUBLICATIONS

Machine Translation of JP 2006266262 A (2006).*

(Continued)

*Primary Examiner* — Brandon Lee
(74) *Attorney, Agent, or Firm* — Taft Stettinius & Hollister

(57) ABSTRACT

A turbocharged internal combustion engine system includes at least one high pressure turbocharger system mounted on-engine and at least one low pressure turbocharger system mounted off-engine. An intercooler can further be mounted off-engine with the low pressure turbocharger and an aftercooler can be mounted on-engine with the high pressure turbocharger.

12 Claims, 2 Drawing Sheets

(56) References Cited

U.S. PATENT DOCUMENTS

| | | |
|---|---|---|
| 6,311,493 B1 | 11/2001 | Kurihara et al. |
| 6,564,783 B2 | 5/2003 | Chou et al. |
| 6,651,618 B1 | 11/2003 | Coleman et al. |
| 6,981,375 B2 | 1/2006 | Sisken et al. |
| 7,201,121 B2 | 4/2007 | Weber et al. |
| 7,540,150 B2 | 6/2009 | Schmid et al. |
| 8,209,982 B2 | 7/2012 | Sumser et al. |
| 2002/0056444 A1 | 5/2002 | Chou et al. |
| 2009/0183506 A1 | 7/2009 | Trombetta et al. |
| 2010/0077747 A1 | 4/2010 | Pierpont et al. |
| 2010/0095941 A1 | 4/2010 | Auffret et al. |
| 2011/0036087 A1 | 2/2011 | Miller |
| 2011/0100343 A1 | 5/2011 | Liu et al. |
| 2011/0185724 A1 | 8/2011 | Barth et al. |
| 2011/0252795 A1* | 10/2011 | Heyes ................... F02B 37/001 60/611 |
| 2011/0253112 A1 | 10/2011 | Guggenberger et al. |
| 2011/0259306 A1 | 10/2011 | Winsor et al. |
| 2012/0036853 A1 | 2/2012 | Kidd et al. |
| 2013/0232969 A1 | 9/2013 | Luhrmann et al. |
| 2014/0260239 A1 | 9/2014 | Genter |

FOREIGN PATENT DOCUMENTS

| | | | |
|---|---|---|---|
| GB | 2353328 A | | 2/2001 |
| JP | 2006266262 A | * | 10/2006 |
| WO | 2006015814 A1 | | 2/2006 |
| WO | 2009147287 A1 | | 12/2009 |
| WO | 2012016712 | | 2/2012 |
| WO | WO 2012123629 A1 | * | 9/2012 ............ F02B 37/013 |

OTHER PUBLICATIONS

European Patent Office, European Search Report issued in European Patent Application No. 15161210.8 dated Aug. 4, 2015, 7 pp.

* cited by examiner

MULTI-STAGE TURBOCHARGER SYSTEM WITH OFF-ENGINE LOW PRESSURE STAGE

FIELD OF INVENTION

The present invention relates to a multi-stage turbocharger system. Particularly, but not exclusively, the present invention relates to a multi-stage turbocharger system with an off-engine low pressure turbocharger stage.

BACKGROUND

Turbochargers are well known devices for supplying air to the intake of an Internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold.

One known approach to improving turbocharging efficiency and reducing emissions for an engine with a wide speed/load range is to provide a sequential two stage turbocharging system, comprising one relatively small high pressure turbocharger and another relatively large low pressure turbocharger. The turbochargers are arranged in series so that exhaust from the engine flows first through the smaller turbine of the high pressure turbocharger and then through the larger turbine of the low pressure turbocharger. The compressors of the two turbochargers are also arranged in series, with air flowing first through the relatively large compressor of the low pressure turbocharger and then through the relatively small compressor of the high pressure turbocharger.

For vehicle applications, the high pressure turbocharger and low pressure turbocharger along with the associated intercoolers and aftercoolers are mounted on the engine. However, this arrangement can be prohibitive in regard to cost, complexity and serviceability due to the complex plumbing and mounting arrangements required to support the air handling components on-engine. For stationary applications such as generators, the high pressure turbocharger and low pressure turbocharger along with the associated intercoolers and aftercoolers are mounted away from the engine to take advantage of engine serviceability that can be provided with such an arrangement. However, heretofore arrangements have not been provided that allow the same base engine configuration to be incorporated in stationary and mobile applications for both multi-stage turbochargers and single stage turbochargers without significant modifications to the engine configuration to accommodate the turbochargers. Therefore, there remains room for further improvements in this technology area.

SUMMARY

There is disclosed herein an alternative or improved multi-stage turbocharger system that includes at least one on-engine mounted high pressure turbocharger and at least one off-engine mounted low pressure turbocharger. As used herein, "on-engine" means that the primary static load supporting structure receiving a substantial portion of the static load of the at least one high pressure turbocharger is the engine block of the Internal combustion engine, either by directly mounting the static load on the engine block or indirectly mounting the static load on the engine block through one or more connecting structures. Also, "off-engine" means that the primary static load supporting structure is at least one support arranged so that a substantial portion of the static load of the at least one low pressure turbocharger is not transferred to the engine block. As further used herein, a "substantial portion" of the static load means the entire static bad except for that portion of the static bad which may be transferred by plumbing and other connections between the high pressure and low pressure turbocharger stages. In one embodiment, the high pressure turbocharger is mounted on-engine with an aftercooler and the low pressure turbocharger is mounted off-engine with an intercooler.

According to one aspect, an internal combustion engine system is disclosed that includes an internal combustion engine including an engine block, at least one intake passage for receiving and delivering an air flow to at least a portion of a plurality of cylinders of the engine block and at least one exhaust passage for receiving exhaust gas from at least a portion of the plurality of cylinders. The system further includes at least one high-pressure turbocharger including a first high pressure turbine situated in the at least one exhaust passage from the internal combustion engine. The at least one high pressure turbocharger further includes a first high pressure compressor operably connected with the first high pressure turbine with the first high pressure compressor situated in the at least one intake passage. The at least one high pressure turbocharger is mounted on-engine. The system also includes at least one low pressure turbocharger with a first low pressure turbine situated in the at least one exhaust passage downstream of the first high pressure turbine. The low pressure turbocharger further includes a first low pressure compressor operably connected to the low pressure turbine with the low pressure compressor situated in the at least one intake passage upstream of the first high pressure compressor. The at least one low pressure turbocharger is mounted off-engine to a support structure.

According to one embodiment, the system includes an aftercooler mounted on-engine in fluid communication with the at least one intake passage downstream of the high pressure compressor and upstream of an intake manifold of the internal combustion engine. The system also includes an intercooler mounted off-engine to the support structure in fluid communication with the at least one intake passage between the low pressure compressor and the high pressure compressor.

In another embodiment, the at least one high pressure turbocharger includes at least two high pressure turbochargers with respective first and second high pressure turbines that are mounted on-engine to the engine block. The at least one high pressure turbocharger further includes respective first and second high pressure compressors mounted on-engine to the engine block that are connected to corresponding ones of the first and second high pressure turbines that are situated in respective ones of second and third intake passages that branch from the at least one intake passage downstream of the first low pressure compressor. In a refinement of this embodiment, the at least one low pressure turbocharger includes at least two low pressure turbochargers with respective first and second low pressure turbines mounted off-engine to the support structure. The first and second low pressure turbines are operably connected with corresponding ones of first and second low pressure compressors mounted to the support structure.

In another embodiment of the system, the at least one low pressure turbocharger includes at least two low pressure turbochargers with respective first and second low pressure turbines mounted off-engine to the support structure. The first and second low pressure turbines are operably connected with corresponding ones of first and second low pressure compressors mounted off-engine to the support structure.

In a further embodiment, the at least one high pressure turbocharger includes four high pressure turbochargers with respective first, second, third and fourth high pressure turbines situated in respective ones of first, second, third, and fourth exhaust passages and four high pressure compressors with first, second, third and fourth high pressure compressors connected to respective ones of the first, second, third and fourth high pressure turbines. The first, second, third and fourth high pressure compressors receive compressed intake flow from the at least one low pressure turbocharger from respective ones of first, second, third and fourth intake passages. Each of the first, second, third, and fourth high pressure turbines and each of the first, second, third and fourth high pressure compressors are mounted on-engine. In yet a further embodiment, the at least one low pressure turbocharger includes four low pressure turbochargers with respective first, second, third and fourth low pressure turbines connected to receive exhaust flow from respective ones of the first, second, third, and fourth high pressure turbines. The four low pressure turbochargers include first, second, third and fourth low pressure compressors connected to respective ones of the first, second, third and fourth low pressure turbines to provide compressed intake flow to respective ones of the first, second, third, and fourth high pressure compressors through respective ones of first, second, third and fourth intake passages. Each of the first, second, third, and fourth low pressure turbines and each of the first, second, third and fourth low pressure compressors are mounted off-engine to the support structure.

In one refinement of the embodiments, the support structure includes a first support structure for two of the low pressure turbochargers and a second support structure of the other two low pressure turbochargers. In yet another refinement, at least one intercooler is connected between the first, second, third and fourth low pressure compressors and the first, second third and fourth high pressure compressors. In a further refinement, the at least one intercooler is mounted off-engine to the support structure. In another refinement, at least one aftercooler is mounted on-engine in fluid communication with the first, second, third and fourth intake passages downstream of the first, second, third and fourth high pressure compressors and upstream of an intake manifold of the internal combustion engine In yet another aspect, a method providing a combustion engine; mounting at least one high pressure turbocharger system on-engine to a block of the internal combustion engine, where the at least one high pressure turbocharger system includes at least one high pressure turbine and at least one high pressure compressor operably connected to the at least one high pressure turbine; fluidly connecting the at least one high pressure turbine to at least one exhaust manifold of the combustion engine; fluidly connecting the at least one high pressure compressor to at least one intake manifold of the combustion engine; mounting at least one least one low pressure turbocharger system off-engine to a support structure, the at least one low pressure turbocharger system including at least one low pressure turbine and at least one low pressure compressor operably connected to the at least one low pressure turbine; fluidly connecting the low pressure compressor to the high pressure compressor; and fluidly connecting the low pressure turbine to the high pressure turbine.

In one embodiment, the method further includes mounting at least one aftercooler on-engine in fluid communication with and between the intake manifold and the high pressure compressor and mounting at least one intercooler off-engine to the support structure in fluid communication with and between low pressure compressor and the high pressure compressor.

In one refinement of this embodiment, the at least one high pressure turbocharger system includes at least two high pressure turbochargers with respective first and second high pressure turbines mounted on-engine and fluidly connected to the exhaust manifold and first and second high pressure compressors operably connected to respective ones of the first and second high pressure turbines. The first and second high pressure compressors are mounted on-engine and fluidly connected to each of the at least one aftercooler and the at least one intercooler. In a further refinement, the at least one low pressure turbocharger system includes at least two low pressure turbochargers with respective first and second low pressure turbines mounted off-engine to the support structure and fluidly connected to respective ones of the first and second high pressure turbines and first and second low pressure compressors mounted off-engine to the support structure and fluidly connected to the at least one intercooler. The first and second low pressure compressors are operably connected to respective ones of the first and second low pressure turbines.

In another refinement of this embodiment, the at least one high pressure turbocharger system includes four high pressure turbochargers with first, second, third and fourth high pressure turbines mounted on-engine and fluidly connected to the exhaust manifold and first, second, third and fourth high pressure compressors operably connected to respective ones of the first, second, third, and fourth high pressure turbines, the first, second, third and fourth high pressure compressors being mounted on-engine and fluidly connected to each of the at least one aftercooler and the at least one intercooler. In a further refinement, the at least one low pressure turbocharger system includes four low pressure turbochargers with respective first, second, third and fourth low pressure turbines mounted off-engine to the support structure and fluidly connected to respective ones of the first, second, third and fourth high pressure turbines and first, second, third and fourth low pressure compressors mounted off-engine to the support structure and fluidly connected to the at least one intercooler. The first, second, third and fourth low pressure compressors are operably connected to respective ones of the first, second, third and fourth low pressure turbines. In yet a further refinement, the method includes mounting two of the four low pressure turbochargers off-engine on the support structure on a first side of the engine and mounting two of the four low pressure turbochargers off-engine to a second support structure on a second side of the engine opposite the first side.

The embodiments disclosed herein offer several advantages over traditional multi-stage turbocharger configurations. For example, the on-engine turbocharger provides a modular engine system with a single stage, on-engine turbocharger that is always provided with the engine and that can be readily transformed into a two-stage system by incorporating the off-engine turbocharger with the engine and on-engine turbocharger. The engine and on-engine turbocharger stage can also be provided with a smaller footprint or length for packaging of, for example, a genset since the low pressure turbocharger is not provided on-engine. The weight of the system can also be optimized prior to shipping since the engine and high pressure turbocharger unit are shipped assembled regardless of whether a single stage or multi-stage system is to be employed. The on-engine high pressure turbocharger also simplifies connections associated with the on-engine turbocharger since they are not required to be made in the field, such as the compressor outlets and exhaust inlets, the interface with the wastegate, the interface with any compressor bypass systems, the oil feed and drain connections, and the turbocharger coolant connections.

Other aspects, embodiments, features and applications of the present invention will be apparent from the following description.

DETAILED DESCRIPTION

Figure 1:
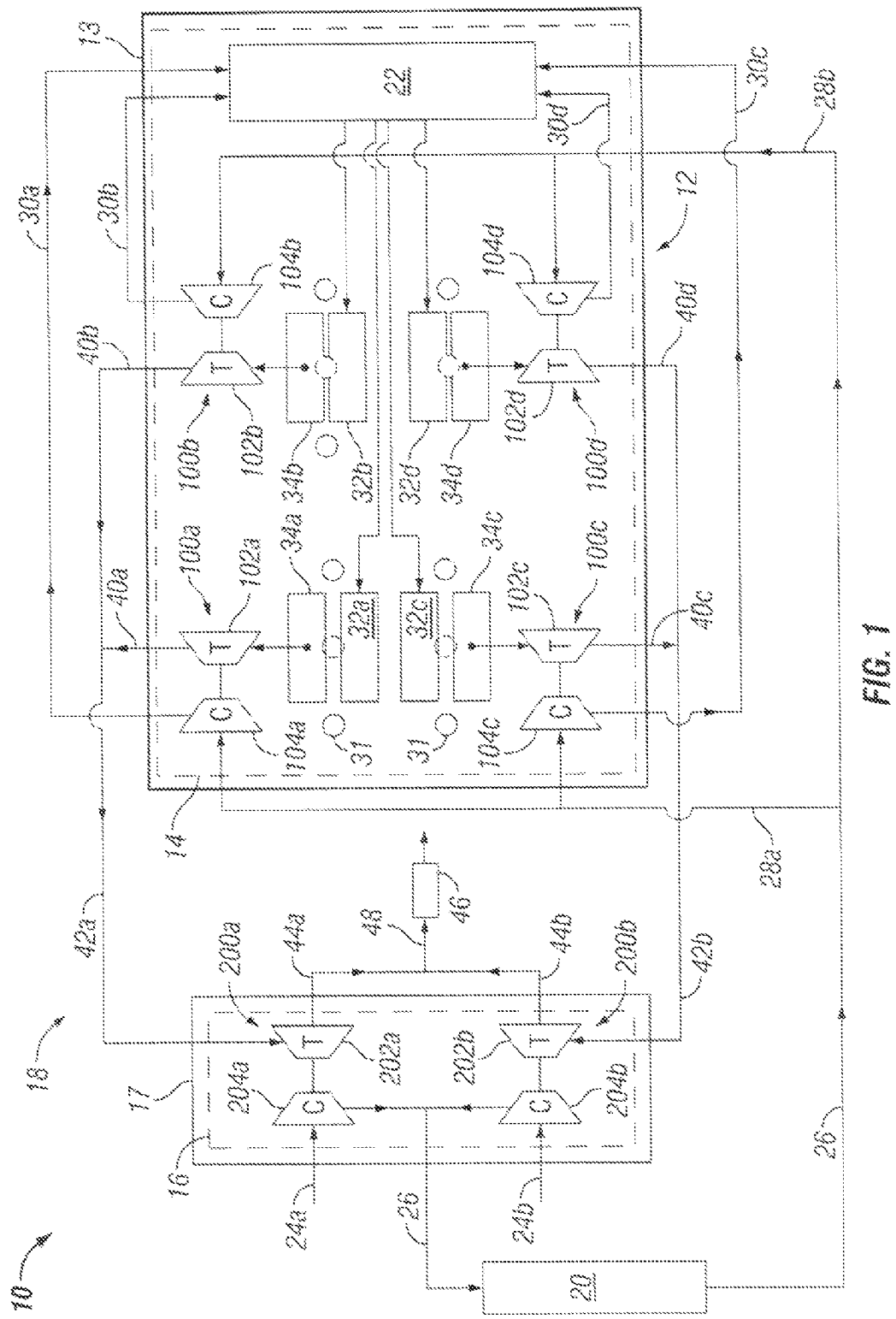
FIG. 1 is a schematic illustration of a multi-stage turbocharger system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, the schematically illustrated sequential multi-stage turbocharger system 10 comprises an internal combustion engine 12 with a high pressure turbocharger stage or system 14 mounted on-engine to transfer a substantial portion of the load of high pressure turbocharger system 14 to engine block 13. Multi-stage turbocharger system 10 also includes a low pressure turbocharger stage or system 16 mounted off-engine to a support 17. Support 17 can be, for example, a skid, base or other structure not mounted to block 13, or support 17 can be the chassis or other part of a vehicle that is not engine block 13 or otherwise connected to transfer a substantial portion of the load of low pressure turbocharger system 16 to engine block 13. High pressure turbocharger system 14 includes at least one on-engine relatively small high pressure turbocharger 100a, and low pressure turbocharger system 16 includes at least one off-engine relatively large low pressure turbocharger 200a connected in series to the exhaust system 18 of internal combustion engine 12 such as a diesel engine. The high pressure turbocharger 100a comprises a relatively small exhaust turbine 102a and a relatively small compressor 104a. The low pressure turbocharger 200a comprises a relatively large exhaust turbine 202a and a relatively large compressor 204a.

The multi-stage turbocharger system 10 delivers compressed air to the engine 12, intercooler 20, and aftercooler 22 via an air net 24a to the low pressure compressor 204a. As used herein, "air" includes fresh air alone or a mixture of fresh air and another component or components, such as any exhaust gas that may be recirculated for mixing with the fresh air and/or fuel that is injected or mixed at the compressor, intercooler 20 may be an air-to-air intercooler, and air-to-liquid intercooler, or any suitable intercooler configuration. Aftercooler 22 may be an air-to-liquid aftercooler, and air-to-air aftercooler, or any suitable aftercooler configuration. Compressed net air is outlet from compressor 204a either directly or via an intake passage 26 into an net of intercooler 20. The compressed net air is cooled in intercooler 20 via a heat exchange process, and then outlet to intake passage 26 for delivery of cooled, compressed net air to high pressure compressor 104a via a second intake air passage 28a. High pressure compressor 104a further compresses and outlets the cooled, compressed net air to aftercooler net 30a. The highly compressed net air is then cooled further by aftercooler 22 and delivered to intake manifold portion 32a for combustion by one or more cylinders 31 of engine 12 that are connected to intake manifold portion 32a.

After the turbocharged net air is combusted in the respective cylinder or cylinder(s) of engine 12, the exhaust gas is outlet into an exhaust manifold portion 34a where it is delivered to the net of high pressure turbine 102a to drive high pressure compressor 104a. The exhaust gas is then outlet from high pressure turbine 102a into a first exhaust passage portion 40a that is connected to a first common exhaust passage 42a. Exhaust gas is delivered to an net of low pressure turbine 202a from first common exhaust passage 42a in order to drive low pressure compressor 204a. Exhaust gas leaves low pressure turbine 202a from an outlet that is connected to first exhaust outlet portion 44a. First exhaust outlet portion 44a is connected to an exhaust outlet 48 having a conventional after-treatment system 46 to treat the exhaust gas for emissions prior to being outlet to atmosphere. The after-treatment system 46 may be one of a variety of types of after-treatment systems, including conventional systems generally known to one of ordinary skill in the art. Types of after-treatment systems contemplated include those designed to remove particulates, nitrogen-oxide compounds, and other regulated emissions. Embodiments without an aftertreatment system are also contemplated.

In one embodiment, turbocharger system 10 includes a low pressure turbocharger system 16 that includes a second low pressure turbocharger 200b mounted off-engine. Second low pressure turbocharger 200b receives air flow from an air net 24b connected to the low pressure compressor 204b. Compressed net air is outlet from compressor 204b either directly or via a connection to intake passage 26 where it is combined with compressed net air from first low pressure compressor 204a for delivery to the net of intercooler 20. The combined flow of compressed net air is cooled in intercooler 20 via a heat exchange process, and then outlet to intake passage 26.

In a further embodiment, multi-stage turbocharger system 10 includes a high pressure turbocharger system 16 that includes at least two on-engine mounted high pressure turbochargers 100a and 100b. The cooled, compressed net air from intercooler 20 is delivered via the first or common intake passage 16 to second intake passage 28a and to a third intake passage 28b. Second intake passage 28a is connected to high pressure compressor 104a via first intake passage 28a where operation of high pressure turbocharger 200a continues as discussed above. Furthermore, high pressure turbocharger system 14 includes second high pressure turbocharger 100b with a second high pressure compressor 104b connected to third intake passage 28b. Second high pressure compressor 104b further compresses and outlets the cooled, compressed net air to aftercooler net 30b. The highly compressed net air is then cooled further by aftercooler 22 and delivered to intake manifold portion 32b for combustion by one or more cylinders (not shown) of engine 12 that are connected to intake manifold portion 32b.

Exhaust gas that is outlet from the cylinder or cylinders connected to intake manifold portion 32b is collected in a second exhaust manifold portion 34b where it is delivered to the net of second high pressure turbine 102b to drive second high pressure compressor 104b. The exhaust gas is then outlet from second high pressure turbine 102b into a second exhaust passage portion 40b that is connected to first common exhaust passage 42a. Exhaust gas is then delivered to an net of low pressure turbine 202a from first common exhaust passage 42a in order to drive low pressure compressor 204a as discussed above.

In a further embodiment, turbocharger system 10 includes a high pressure turbocharger system 16 that includes four high pressure turbochargers 100a, 100b, 100c and 100d mounted on-engine. The cooled, compressed inlet air from intercooler 20 is delivered via first or common intake passage 26 to second intake passage 28a and to third intake passage 28b. Second intake passage 28a is connected to high pressure compressor 104a via first intake passage 28a where operation of high pressure turbocharger 100a and aftercooling and combustion of the net air continues as discussed above. Furthermore, third high pressure turbocharger 100c includes a third high pressure compressor 104c connected to second intake passage 28a. Third high pressure compressor 104c further compresses and outlets the cooled, compressed net air to aftercooler net 30c. The highly compressed net air is then cooled further by aftercooler 22 and delivered to intake manifold portion 32c for combustion by one or more cylinders (not shown) of engine 12 that are connected to intake manifold portion 32c.

Exhaust gas that is outlet from the cylinder or cylinders connected to intake manifold portion 32c is collected in a second exhaust manifold portion 34c where it is delivered to the net of third high pressure turbine 102c to drive third high pressure compressor 104c. The exhaust gas is then outlet from third high pressure turbine 102c into a third exhaust passage portion 40c that is connected to a second common exhaust passage 42b. Exhaust gas is then delivered to an inlet of second low pressure turbine 202b from second common exhaust passage 42b in order to drive low pressure compressor 204b as discussed above.

Third intake passage 28b is connected to second high pressure compressor 104b where operation of second high pressure turbocharger 100b and aftercooling and combustion of the net air continues as discussed above. Furthermore, fourth high pressure turbocharger 100d includes a fourth high pressure compressor 104d connected to third intake passage 28b. Fourth high pressure compressor 104d further compresses and outlets the cooled, compressed net air to aftercooler net 30d. The highly compressed net air is then cooled further by aftercooler 22 and delivered to intake manifold portion 32d for combustion by one or more cylinders (not shown) of engine 12 that are connected to intake manifold portion 32d.

Exhaust gas that is outlet from the cylinder or cylinders connected to intake manifold portion 32d is collected in a second exhaust manifold portion 34d where ft is delivered to the net of fourth high pressure turbine 102d to drive fourth high pressure compressor 104d. The exhaust gas is then outlet from fourth high pressure turbine 102c into a fourth exhaust passage portion 40d that is connected to second common exhaust passage 42b to combine with the exhaust flow from third high pressure turbine 102c in second common exhaust passage 42b to drive low pressure compressor 204b as discussed above.

In one embodiment, the intercooler 20 is mounted on support 17 and uses outside air to cool the intake air after it has been compressed by low pressure turbochargers 200a, 200b. Aftercooler 22 can be located on top of engine 12 and mounted to block 13, and connected with plumbing that provides cooling water or other fluid from a separate circuit (not shown) to the core of aftercooler 22. The plumbing can further be connected with a heat exchanger or radiator to reject the heat added to the cooling water from the compressed intake air flow into aftercooler 22. The compressed inlet air passes through fins of one or more stages of aftercooler 22 before being outlet to the intake manifold portions 32a-32d.

Incorporating intercooler 20 with low pressure turbocharger stages 16 off-engine provides the low pressure turbocharger system and engine 12 and its on-engine high pressure turbochargers 14/aftercooler 22 as separate modular packages that can be readily incorporated with one another. This arrangement also provides a stand-alone package including engine 12 and high pressure turbochargers 16/aftercooler 22 to be employed in applications were a single stage turbocharger system is desired. Both arrangements avoid significant engine modifications required of prior systems that employ multi-stage turbochargers either entirely on-engine or entirely off-engine. As a result, system 10 provides improved packaging, serviceability and modularity for a multi-stage turbocharger system that can also be readily employed in a single stage turbocharger system.

Figure 2:
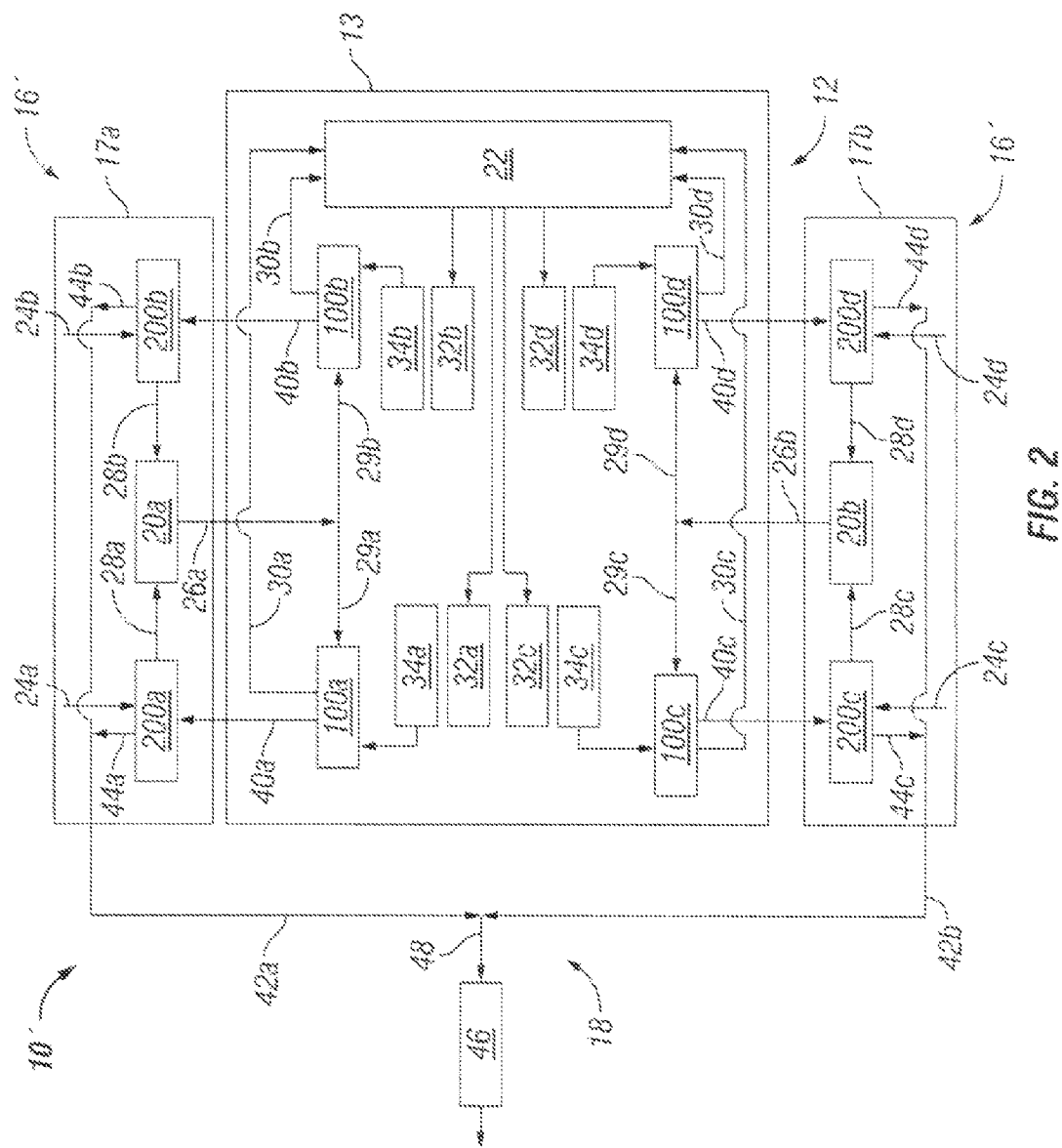
FIG. 2 is a schematic illustration of another embodiment of a multi-stage turbocharger system.

According to another embodiment of system 10, designated as multi-stage turbocharger system 10' in FIG. 2, low pressure turbocharger system 16' includes four low pressure turbochargers 200a, 200b, 200c and 200d fluidly connected to respective ones of four high pressure turbochargers 100a, 100b, 100c, 100d. In the illustrated embodiment, two of the low pressure turbochargers 200a, 200b are supported off-engine on support 17a on a first side of engine 12, and the remaining two low pressure turbochargers 200c, 200d are supported off-engine on a second side of engine 12 with support 17b. A first intercooler 20a is supported on support 17a and is connected to low pressure turbochargers 200a, 200b with first and second intake passage portions 28a, 28b. Intercooler 20a is further connected with respective ones of first and second high pressure turbochargers 100a, 100b with first common intake passage portion 26a and intake passage branches 29a, 29b. A second intercooler 20b is supported on second support 17b and is connected to low pressure turbochargers 200c, 200d with third and fourth intake passage portions 28c, 28d. Intercooler 20b is further connected with respective ones of third and fourth high pressure turbochargers 100c, 100d with second common intake passage portion 26b and intake passage branches 29a, 29b. Alternatively, each of the compressor inlets of high pressure turbochargers 100a, 100b, 100c, 100d can be separately connected to respective ones of first and second outlets of intercoolers 20a, 20b. In addition, the compressor outlets of low pressure turbochargers 200a, 200b can be combined into a single inlet of intercooler 20a, and/or the compressor outlets of low pressure turbochargers 200c, 200d can be combined into a single inlet of intercooler 20b.

In addition, each of the turbine outlets of high pressure turbochargers 100a, 100b, 100c, 100d is connected to respective ones of the turbine inlets of low pressure turbochargers 200a, 200b, 200c, 200d with exhaust passage portions 40a, 40b, 40c, 40d. The turbine outlets of low pressure turbochargers 200a, 200b are connected to first common exhaust passage 42a and the turbine outlets of low pressure turbochargers 200c, 200d are connected to second common exhaust passage 42b. Common exhaust passages 42a, 42b come together at exhaust outlet 48 to provide exhaust gas to aftertreatment system 48. Alternatively, separate aftertreatment systems can be provided for each of the common exhaust passages 42a, 42b. In yet another embodiment, a separate aftertreatment system is provided at the outlet of each low pressure turbocharger 200a, 200b, 200c, 200d.

In an example embodiment of a method of use, operation, or application, multi-stage turbocharger system 10, 10' includes an on-engine high pressure turbocharger system 14 and an off-engine lower pressure turbocharger system 16 that can be separately packaged and modular so that the engine 12 with on-engine high pressure turbocharger system 14 can be used with or without a second turbocharger stage, facilitating testing, shipping and skid design for engine 12 since the high pressure turbocharger system 14 can be packaged with engine 12 before shipment. For applications employing the low pressure turbocharger stage off-engine, additional efficiency improving devices such as a front mounted air filtration system can be incorporated on engine 12 without significant interference from low pressure turbocharger system 16. Engine 12 with on-engine high pressure turbocharger system 14 and aftercooler 22 can be provided as a separate unit from low pressure turbocharger system 16 and intercooler 20 un support 17. The off-engine low pressure turbocharger system 16 and intercooler 20 are then connected to on-engine high pressure turbocharger system 14 on site.

It will be appreciated that features and modifications that can be made to the turbocharger system of FIGS. 1 and 2, such as for instance the inclusion of a wastegate around the low pressure turbine(s), and application of the system to an engine including the inclusion of an exhaust gas re-circulation system. Exhaust gas flow control valves can also be provided to modulate the exhaust gas flow to the high pressure and low pressure turbochargers in varied operating conditions, and in accordance with various possible control regimes.

Although two stage turbocharger systems comprising fixed geometry turbines may in some respects provide an alternative to the use of relatively complex and expensive variable geometry turbochargers, the turbochargers of one or both stages of the two stage turbocharger system could be a variable geometry turbocharger (of any type). This may be desirable for instance to further improve control over the turbocharger system and the ability to optimize turbocharger performance across a wide range of engine conditions.

In the above described embodiments of the invention there four parallel high pressure turbines. However, it will be appreciated that a turbocharger system according to the present invention could for instance include a single high pressure turbine. For example, the high pressure turbine could receive an exhaust gas flow from all of the cylinders from a multi-cylinder engine. In such embodiments, the outlet from the high pressure turbine can flow to a single low pressure turbine located downstream of the high pressure turbine, or the flow may be split between two (or more) low pressure turbines downstream of the high pressure turbine.

Furthermore, it will be appreciated that a turbocharger system according to the present invention could for instance include two parallel high pressure turbines. For example, each of two high pressure turbines could receive an exhaust gas flow from a respective bank of cylinders from a multi-cylinder engine (for instance each receiving exhaust gas from one bank of a "V" configured engine). In such embodiments, the outlet from each high pressure turbine can be combined upstream for flow to a single low pressure turbine located downstream of the high pressure turbines, or the flow may be split between two (or more) low pressure turbines downstream of the high pressure turbines.

In embodiments comprising more than one high pressure turbine, the high pressure turbines can be linked to a common high pressure compressor or to separate respective high pressure compressors. In embodiments comprising more than one low pressure turbine, the low pressure turbines can be linked to a common low pressure compressor or to separate respective low pressure compressors.

In embodiments comprising more than one high pressure turbine, the high pressure turbines can be linked to a common high pressure compressor or to separate respective high pressure compressors. In embodiments comprising more than one low pressure turbine, the low pressure turbines can be linked to a common low pressure compressor or to separate respective low pressure compressors.

Alternatively, rather than providing two separate high pressure turbines to receive exhaust gas flow from two separate banks of engine cylinders, a single twin entry high pressure turbine could be included in a turbocharger system according to the present invention. Moreover, in a turbocharger system according to the present invention comprising one or more high pressure turbines, each of the high pressure turbines could be configured as a twin-entry turbine.

Similarly, it will be appreciated that a turbocharger system in accordance with the present invention could have more than one set of sequentially connected turbochargers operating in parallel. For instance, a first turbocharger system generally as described above could receive an exhaust gas flow from a first set of cylinders of a multi-cylinder combustion engine, and a second sequential turbocharger arrangement as described above could receive exhaust gas flow from a second set of cylinders of the engine (each "set" could comprise a single cylinder).

It will further be appreciated that the present invention is not limited to a two stage sequential turbocharger system, but could be embodied in a turbocharger system comprising more than two turbine stages connected in series. In addition, each stage may include one turbocharger or multiple turbochargers, and systems are contemplated in which a different number of turbochargers are provided on each stage. For example, one stage could include a single turbocharger, and another stage can include multiple turbochargers.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An internal combustion engine system, comprising:
an internal combustion engine including an engine block,
at least one intake passage for receiving and delivering an air flow to at least a portion of a plurality of cylinders of the engine block and at least one exhaust passage for receiving exhaust gas from the at least the portion of the plurality of cylinders;

at least one high pressure turbocharger including a first high pressure turbine situated in the at least one exhaust passage from the internal combustion engine, the at least one high pressure turbocharger further including a first high pressure compressor operably connected with the first high pressure turbine with the first high pressure compressor situated in the at least one intake passage, wherein the at least one high pressure turbocharger is mounted on-engine to the engine block;

a support structure;

at least two low pressure turbochargers with a first low pressure turbine and a second low pressure turbine each situated in the at least one exhaust passage downstream of the first high pressure turbine, the at least two low pressure turbochargers further including a first low pressure compressor operably connected to the first low pressure turbine with the first low pressure compressor situated in the at least one intake passage upstream of the first high pressure compressor and a second low pressure compressor operably connected to the second low pressure turbine with the second low pressure compressor situated in the at least one intake passage upstream of the first high pressure compressor, wherein the at least two low pressure turbochargers are mounted off-engine to the support structure so that a substantial portion of a static load of the at least two low pressure turbochargers are not transferred to the engine block;

an aftercooler mounted on-engine in fluid communication with the at least one intake passage downstream of the first high pressure compressor and upstream of an intake manifold of the internal combustion engine; and at least one intercooler mounted off-engine to the support structure in fluid communication with the at least one intake passage between the first and second low pressure compressors and the first high pressure compressor, wherein outlets of each of the first and second low pressure compressors are connected by respective ones of first and second intake passage portions that extend to the at least one intercooler.

2. The internal combustion engine system of claim 1, wherein the at least one high pressure turbocharger includes at least two high pressure turbochargers with the first high pressure turbine and a second high pressure turbine that are each mounted on-engine, the at least one high pressure turbocharger further including the first high pressure compressor and a second high pressure compressor each mounted on-engine that are connected to corresponding ones of the first and second high pressure turbines and are situated in respective ones of a second intake passage and a third intake passage that each branch from the at least one intake passage downstream of the first and second low pressure compressors.

3. The internal combustion engine system of claim 1, wherein the at least one high pressure turbocharger includes four high pressure turbochargers with the first high pressure turbine, a second high pressure turbine, a third high pressure turbine and a fourth high pressure turbine situated in respective ones of a first exhaust passage, a second exhaust passage, a third exhaust passage, and a fourth exhaust passage and four high pressure compressors with the first high pressure compressor, a second high pressure compressor, a third high pressure compressor, and a fourth high pressure compressor each connected to respective ones of the first, second, third and fourth high pressure turbines, the first, second, third and fourth high pressure compressors receiving compressed intake flow from the at least two low pressure turbochargers from respective ones of a first intake passage, a second intake passage, a third intake passage and a fourth intake passage, wherein each of the first, second, third, and fourth high pressure turbines and each of the first, second, third and fourth high pressure compressors are mounted on-engine.

4. The internal combustion engine system of claim 3, wherein the at least two low pressure turbochargers includes four low pressure turbochargers with the first low pressure turbine, the second low pressure turbine, a third low pressure turbine and a fourth low pressure turbine connected to receive exhaust flow from respective ones of the first, second, third, and fourth high pressure turbines, the four low pressure turbochargers including the first low pressure compressor, the second low pressure compressor, a third low pressure compressor, and a fourth low pressure compressor connected to respective ones of the first, second, third and fourth low pressure turbines to provide compressed intake flow to respective ones of the first, second, third, and fourth high pressure compressors through respective ones of the first intake passage, the second intake passage, the third intake passage, and the fourth intake passage, wherein each of the first, second, third, and fourth low pressure turbines and each of the first, second, third and fourth low pressure compressors are mounted off-engine to the support structure.

5. The internal combustion engine system of claim 4, wherein the support structure includes a first support structure for two of the low pressure turbochargers and a second support structure of the other two low pressure turbochargers.

6. The internal combustion engine system of claim 4, wherein the aftercooler is mounted on-engine in fluid communication with and downstream of the first, second, third and fourth high pressure compressors and upstream of the at least one intake manifold of the internal combustion engine.

7. A method for assembly of a combustion engine, including:
providing the combustion engine;
mounting at least one high pressure turbocharger system on-engine to a block of the combustion engine, wherein the at least one high pressure turbocharger system includes at least one high pressure turbine and at least one high pressure compressor operably connected to the at least one high pressure turbine;
fluidly connecting the at least one high pressure turbine to at least one exhaust manifold of the combustion engine;
fluidly connecting the at least one high pressure compressor to at least one intake manifold of the combustion engine;
mounting at least one low pressure turbocharger system off-engine to a support structure, the at least one low pressure turbocharger system including at least two low pressure turbines and at least two low pressure compressors operably connected to respective ones of the at least two low pressure turbines, wherein the at least one low pressure turbocharger system is mounted to the support structure so that a substantial portion of a static load of the at least one low pressure turbocharger system is not transferred to the engine block;
fluidly connecting one of the at least two low pressure compressors to the at least one of the high pressure compressor;
fluidly connecting one of the at least two low pressure turbines to the at least one of the high pressure turbine;

mounting at least one aftercooler on-engine in fluid communication with and between the at least one of the intake manifold and the at least one of high pressure compressor; and mounting at least one intercooler off-engine to the support structure in fluid communication with and between the at least two low pressure compressors and the high pressure compressor, wherein outlets of each of the first and second low pressure compressors are connected to the at least one intercooler by respective ones of first and second intake passage portions that extend to the at least one intercooler.

8. The method for assembly of the combustion engine of claim 7, wherein the at least one high pressure turbocharger system includes at least two high pressure turbochargers with respective ones of a first high pressure turbine and a second high pressure turbine each mounted on-engine and fluidly connected to the at least one exhaust manifold and a first high pressure compressor and a second high pressure compressor operably connected to respective ones of the first and second high pressure turbines, the first and second high pressure compressors being mounted on-engine and fluidly connected to each of the at least one aftercooler and the at least one intercooler.

9. The method for assembly of the combustion engine of claim 7, wherein the at least one high pressure turbocharger system includes four high pressure turbochargers with a first high pressure turbine, a second high pressure turbine, a third high pressure turbine, and a fourth high pressure turbine all mounted on-engine and fluidly connected to the at least one exhaust manifold and a first high pressure compressor, a second high pressure compressor, a third high pressure compressor, and a fourth high pressure compressor operably connected to respective ones of the first, second, third, and fourth high pressure turbines, the first, second, third and fourth high pressure compressors being mounted on-engine and fluidly connected to each of the at least one aftercooler and the at least one intercooler.

10. The method for assembly of the combustion engine of claim 9, wherein the at least one low pressure turbocharger system includes four low pressure turbochargers with a first low pressure turbine, a second low pressure turbine, a third low pressure turbine and a fourth low pressure turbine each mounted off-engine to the support structure and fluidly connected to respective ones of the first, second, third and fourth high pressure turbines and the four low pressure turbochargers include a first low pressure compressor, a second low pressure compressor, a third low pressure compressor, and a fourth low pressure compressor each mounted off-engine to the support structure and fluidly connected to the at least one intercooler, the first, second, third and fourth low pressure compressors being operably connected to respective ones of the first, second, third and fourth low pressure turbines.

11. The method for assembly of the combustion engine of claim 10, further comprising a step of mounting the two of the four low pressure turbochargers on a second support structure on a first side of the engine and the other two of the four low pressure turbochargers are mounted off-engine on the support structure on a second side of the engine opposite the first side.

12. An internal combustion engine system comprising:
an internal combustion engine including an engine block, at least one intake passage for receiving and delivering an air flow to at least a portion of a plurality of cylinders of the engine block and at least one exhaust passage for receiving exhaust gas from the at least the portion of the plurality of cylinders;
at least one high pressure turbocharger including at least one high pressure turbine situated in the at least one exhaust passage from the internal combustion engine, the at least one high pressure turbocharger further including at least one first high pressure compressor operably connected with the at least one first high pressure turbine with the at least one high pressure compressor situated in the at least one intake passage, wherein the at least one high pressure turbocharger is mounted on-engine to the engine block;
first and second support structures; and
first, second, third and fourth low pressure turbochargers having an associated first, second, third and fourth low pressure turbines situated in the at least one exhaust passage downstream of the at least one high pressure turbine, the four low pressure turbochargers including first, second, third, and fourth low pressure compressors, operably connected to respective ones of the first, second, third and fourth low pressure turbines to provide compressed intake air flow to the at least one high pressure turbocharger through the at least one intake passage,
wherein the first and second low pressure turbochargers are mounted off-engine to the first support structure on a first side of the internal combustion engine and respective outlets of the first and second low pressure compressors are connected by respective ones of first and second intake passage portions to a first intercooler that is supported on the first support structure, and the third and fourth low pressure turbochargers are mounted off-engine to the second support structure on a second side of the internal combustion engine opposite the first side so that a substantial portion of a static loads associated with the first, second, third and fourth low pressure turbochargers are not transferred to the engine block and respective outlets of the third and fourth low pressure compressors are connected by respective ones of third and fourth intake passage portions to a second intercooler that is supported on the second support structure.

\* \* \* \* \*